US012608811B2

(12) United States Patent
Al-Qaisi et al.

(10) Patent No.: US 12,608,811 B2
(45) Date of Patent: Apr. 21, 2026

(54) AUTOMATIC SEGMENTATION OF ANTERIOR SEGMENT OF AN EYE IN OPTICAL COHERENCE TOMOGRAPHY IMAGES

(71) Applicant: Alcon Inc., Fribourg (CH)

(72) Inventors: Muhammad K. Al-Qaisi, Ladera Ranch, CA (US); Kongfeng Berger, San Jose, CA (US); Parisa Rabbani, Aliso Viejo, CA (US)

(73) Assignee: ALCON INC., Fribourg (CH)

( * ) Notice: Subject to any disclaimer, the term of this patent is extended or adjusted under 35 U.S.C. 154(b) by 294 days.

(21) Appl. No.: 17/453,550

(22) Filed: Nov. 4, 2021

(65) Prior Publication Data

US 2022/0148186 A1     May 12, 2022

Related U.S. Application Data

(60) Provisional application No. 63/112,805, filed on Nov. 12, 2020.

(51) Int. Cl.
*G06T 7/11*          (2017.01)
*G06T 7/136*         (2017.01)
(Continued)

(52) U.S. Cl.
CPC ............... *G06T 7/11* (2017.01); *G06T 7/136* (2017.01); *G06T 7/155* (2017.01); *G06T 7/194* (2017.01);
(Continued)

(58) Field of Classification Search
CPC . G06T 7/11; G06T 7/136; G06T 7/194; G06T 7/50; G06T 7/155;
(Continued)

(56) References Cited

U.S. PATENT DOCUMENTS 9,521,994 B2 * 12/2016 Kamen .................. A61B 34/20
2005/0259855 A1 * 11/2005 Dehmeshki ............. G06T 7/155
                                                    382/173
(Continued)

FOREIGN PATENT DOCUMENTS

JP          2015066083 A      4/2015
JP          2017504370 A      2/2017
(Continued)

OTHER PUBLICATIONS

Almotiri Jasem et al.: "A Multi-Anatomical Retinal Structure Segmentation System for Automatic Eye Screening Using Morphological Adaptive Fuzzy Thresholding", IEEE Journal of Translational Engineering in Health and Medicine, May 17, 2018, vol. 6: 3800123, 23 pages.
(Continued)

*Primary Examiner* — Jonathan S Lee
*Assistant Examiner* — D J Dhooge

(57)          ABSTRACT

Provided herein are techniques for automatically segmenting anterior segment of an eye in an optical coherence tomography (OCT) image. A method includes receiving an OCT image of an eye; cropping, based on one or more structures of the eye in the OCT image, the OCT image of the eye into one or more sub-images corresponding to the one or more structures; for each of the one or more sub-images of the OCT image of the eye: generating a background seed and a foreground seed of the sub-image; generating, based on the background and the foreground seeds, and an image segmentation model, a mask for a structure of the one or more structures of the eye included in the sub-image; generating, based on the mask for the structure, one or more contours of the structure included in the sub-image; and displaying the one or more contours on the sub-image.

16 Claims, 6 Drawing Sheets

(51) Int. Cl.

| | |
|---|---|
| *G06T 7/155* | (2017.01) |
| *G06T 7/194* | (2017.01) |
| *G06T 7/50* | (2017.01) |

(52) U.S. Cl.

CPC ...... *G06T 7/50* (2017.01); *G06T 2207/10101* (2013.01); *G06T 2207/20021* (2013.01); *G06T 2207/20036* (2013.01); *G06T 2207/20132* (2013.01); *G06T 2207/20156* (2013.01); *G06T 2207/30041* (2013.01)

(58) Field of Classification Search

CPC . G06T 2207/10101; G06T 2207/20021; G06T 2207/20036; G06T 2207/20132; G06T 2207/20156; G06T 2207/30041

See application file for complete search history.

(56) References Cited

U.S. PATENT DOCUMENTS

| | | | | |
|---|---|---|---|---|
| 2013/0181976 | A1* | 7/2013 | Dastmalchi | A61B 5/748 |
| | | | | 345/419 |
| 2015/0077705 | A1* | 3/2015 | Artsyukhovich | A61B 3/1015 |
| | | | | 351/206 |
| 2016/0367399 | A1* | 12/2016 | Goldshleger | A61F 9/0084 |
| 2019/0108636 | A1* | 4/2019 | Bagherinia | G06F 18/2415 |
| 2019/0164294 | A1* | 5/2019 | Ren | G06T 7/12 |
| 2020/0074622 | A1 | 3/2020 | Yang et al. | |

FOREIGN PATENT DOCUMENTS

| | | |
|---|---|---|
| JP | 2019528113 A | 10/2019 |
| JP | 2020032190 A | 3/2020 |
| WO | 2015084462 A1 | 6/2015 |
| WO | 2018035473 A2 | 2/2018 |
| WO | 2020023959 A1 | 1/2020 |

OTHER PUBLICATIONS

Dodo Bashir Isa: "Retinal layer segmentation from optical coherence tomography images", PHD Thesis, May 30, 2020, pp. 1-168, retrieved on Feb. 4, 2022 from the internet URL: https: //bura.brunel.ac.uk/bitstream/2438/20943/1/FulltextThesis.pdf, Chapter 6 Fuzzy Histogram Hyperbolization and Continuous Max-Flow.

Santos Luis et al.: "Medical Image Segmentation Using Seeded Fuzzy C-means: A Semi-supervised Clustering Algorithm", 2018 International Joint Conference on Neural Networks (IJCNN), IEEE, Jul. 8, 2018, 7 pages.

Rother, C., Kolmogorov, V., Blake, A.: GrabCut: interactive foreground extraction using iterated graph cuts. In: ACM Transaction Graphics (TOG), vol. 23, ACM, pp. 309-314 (2004).

Yan Li, et al., Segmentation of 830nm and 1310nm LASIK corneal optical coherence tomography images, Medical Imaging 2002, 4684, 167-178, 2002.

* cited by examiner

AUTOMATIC SEGMENTATION OF ANTERIOR SEGMENT OF AN EYE IN OPTICAL COHERENCE TOMOGRAPHY IMAGES

BACKGROUND

Field

Embodiments of the present disclosure generally relate to methods and apparatus for ophthalmic image segmentation, and more particularly, to methods and apparatus for automatic segmenting of anterior segment of an eye in optical coherence tomography (OCT) images generated based on scan data from an ophthalmic scanning device.

Description of the Related Art

OCT images that include the anterior segment of the eye may provide significant diagnostic information to a clinician. Extracting such diagnostic information from the structures of the anterior segment may require these structures to be segmented from the OCT image. However segmenting the structures of the anterior segment of the eye in an OCT image is challenging as existing systems and techniques fail to perform satisfactorily as the signal-to-noise ratio of these structures (e.g., posterior cornea, posterior lens, and the like) in an OCT image can be low.

Furthermore, existing systems and techniques for segmenting the structures of the anterior segment of an eye in an OCT image require frequent interventions by a user, thus preventing these systems and techniques from being applied in a real-world application designed to be utilized by a clinician.

SUMMARY

The present disclosure generally relates to methods and apparatus for automatically segmenting anterior segment an eye in an OCT image.

In certain embodiments, a method for image segmentation of optical coherence tomography (OCT) image of an eye includes receiving the OCT image of the eye. The method further includes cropping, based on one or more structures of the eye in the OCT image, the OCT image of the eye into one or more sub-images corresponding to the one or more structures. The method also includes, for each of the one or more sub-images of the OCT image of the eye, generating a background seed and a foreground seed of the sub-image. The method further includes, for each of the one or more sub-images of the OCT image of the eye, generating, based on the background and the foreground seeds, and an image segmentation model, a mask for a structure of the one or more structures of the eye included in the sub-image. The method also includes, for each of the one or more sub-images of the OCT image of the eye, generating, based on the mask for the structure, one or more contours of the structure included in the sub-image. The method further includes, for each of the one or more sub-images of the OCT image of the eye, displaying the one or more contours on the sub-image.

In certain embodiments, an optical coherence tomography (OCT) system generally includes a memory comprising computer-executable instructions. The OCT system further includes a processor configured to execute the computer-executable instructions and cause the OCT system to generate an OCT image of an eye. The processor is further configured to cause the OCT system to, for each of the one or more sub-images of the OCT image of the eye, generate a background seed and a foreground seed of the sub-image. The processor is further configured to cause the OCT system to, for each of the one or more sub-images of the OCT image of the eye, generate, based on the background and the foreground seeds, and an image segmentation model, a mask for a structure of the one or more structures of the eye included in the sub-image. The processor is further configured to cause the OCT system to, for each of the one or more sub-images of the OCT image of the eye, generate, based on the mask for the structure, one or more contours of the structure included in the sub-image. The processor is further configured to cause the OCT system to, for each of the one or more sub-images of the OCT image of the eye, display the one or more contours on the sub-image.

Aspects of the present disclosure provide means for, apparatus, processors, and computer-readable mediums for performing the methods described herein.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to methods and apparatus for automatically segmenting the anterior segment of a scanned eye in an OCT image.

Figure 1:
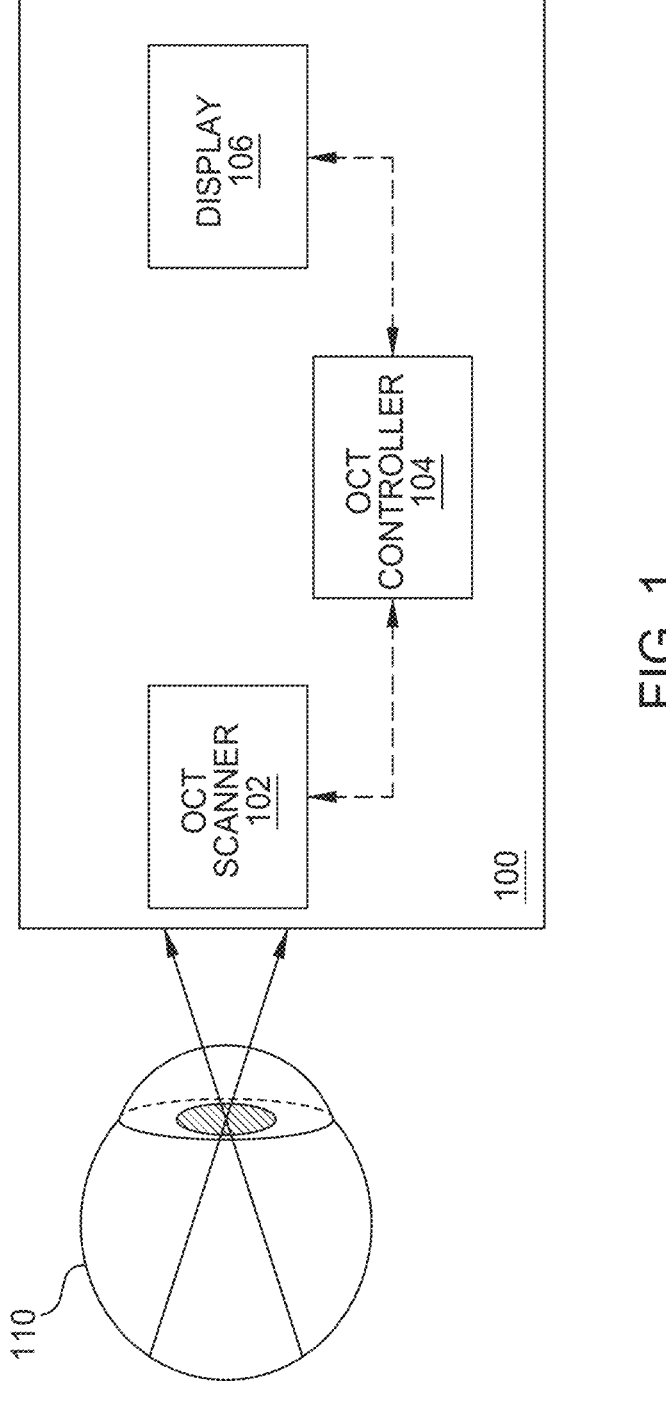
FIG. 1 illustrates a block diagram of selected components of an example imaging system, in accordance with certain embodiments of the present disclosure.

FIG. 1 illustrates a block diagram of selected components of an example imaging system 100. The imaging system 100 includes an optical coherence tomography (OCT) scanner 102, an OCT controller 104, and a display 106.

The OCT scanner 102 may include a number of OCT components and/or instruments (not shown separately). The OCT components and/or instruments may be of various types, and the OCT scanner 102 may be configured differently based on the types of the OCT components and/or instruments. In some implementations, the OCT scanner 102 may be configured as a time domain OCT (TD-OCT). In some implementations, the OCT scanner 102 may be configured as a frequency domain OCT (FD-OCT). In some implementations, the OCT scanner 102 may be configured as a swept-source OCT (SS-OCT).

The OCT scanner 102 performs OCT scanning of an eye 110 of a patient. The OCT scanner 102 may perform the OCT scanning by controlling output of one or more sample beams (not shown) onto the eye 110, and receiving one or more measurement beams (not shown) reflected back from the eye 110. The one or more measurement beams may be reflected back from the eye 110 in response to the photons of the sample beam interacting with the tissue in the eye 110. The OCT scanner 102 may be configured to move the sample beam to a certain location of the eye in response to receiving a command and/or location information from the OCT controller 104.

The OCT scanner 102 may be configured to scan the eye 110 at various depths of the eye 110. For example, the OCT scanner 102 may be configured to scan the entire depth of the eye 110 for a full eye scan of the eye 110. Similarly, the OCT scanner 102 may be configured to scan any portion of the eye 110, such as the anterior segment of the eye 110. In some implementations, the anterior segment of an eye may include structures in the front third of the eye. In some implementations, the anterior segment of the an eye may include structures in front of the virteous humour of the eye, including, but not limited to, the cornea, the iris, the lens (e.g., anterior lens, posterior lens) and the like. The OCT scanner 102 may be configured to scan other portions of the eye 110 including, but not limited to, structures that are not within the anterior segment of the eye 110, such as retina of the eye 110, and the like. In some implementations, the OCT scanner 102 may scan different depths of the eye 110 at different resolutions. For example, the OCT scanner 102 may scan the entire depth of the eye 110 at a lower resolution, and may scan a portion of the eye 110, such as the structures of the anterior segment at a higher resolution.

The OCT scanner 102 may be configured to generate scan data based on the one or more measurement beams reflected back from the eye. The scan data may represent a depth profile of the scanned tissue. In some implementations, the scan data generated by the OCT scanner 102 may include two-dimensional (2D) scan data of a line scan (B-scan). In some implementations, the scan data generated by the OCT scanner 102 may include three-dimensional (3D) scan data of an area scan (C-scan, en face). The OCT scanner 102 may be configured to transmit the generated scan data to the OCT controller 104. In some implementations, the OCT scanner 102 may be configured to transmit the generated scan data in real-time or near real-time. In some implementations, the OCT scanner 102 may be configured to transmit the generated scan data after the entire scanning operation is completed by the OCT scanner 102.

The OCT scanner 102 may be configured to initiate scanning of the eye 110 in response to receiving a command and/or instruction from the OCT controller 104. The OCT controller 104 may be configured to transmit a scan initiation command to the OCT scanner 102 in response to receiving an indication from a user, such as a surgeon, clinician, medical personnel, and the like, to initiate scanning of the eye. In some implementations, the indication from the user may provide information related to depth and/or location of the eye for scanning, and the OCT controller 104 may be configured to provide the received eye depth and/or location related information to the OCT scanner 102. For example, an indication received by the OCT controller 104 may indicate a full eye OCT scan, and the OCT controller 104 may transmit an instruction to the OCT scanner 102 that indicates a full eye OCT scan. Similarly, an indication received by the OCT controller 104 may indicate an OCT scan of the anterior segment of the eye, and the OCT controller 104 may transmit an instruction to the OCT scanner 102 that indicates an OCT scan of the anterior segment of the eye. Similarly, an indication received by the OCT controller 104 may indicate an OCT scan of other structures of the eye, and the OCT controller 104 may transmit an instruction to the OCT scanner 102 that indicates an OCT scan of the corresponding structures of the eye 110.

The OCT controller 104 may be configured to receive the indication to initiate scanning of the eye via a user interface (e.g., a graphical user interface (GUI)) and/or an input device (not shown). Input devices may be communicatively coupled to and/or incorporated with the imaging system 100. Examples of input devices include, but are not limited to, a key pad, a keyboard, a touch screen device configured to receive touch inputs, and the like.

The OCT controller 104 may be communicatively coupled to the OCT scanner 102 via one or more electrical and/or communication interfaces. In some implementations, the one or more electrical and/or communication interfaces may be configured to transmit data (e.g., scan data generated by the OCT scanner 102) from the OCT scanner 102 at a high transmission rate such that the OCT controller 104 may receive the data in real-time or near real-time from the OCT scanner 102.

The OCT controller 104 may be configured to generate one or more OCT images based on the received generated scan data from the OCT scanner 102. For example, the OCT controller 104 may be configured to generate a 2D image or a B-scan image based on the generated 2D scan data of a line scan. Similarly, the OCT controller 104 may be configured to generate a 3D image or a C-scan based on the generated 3D scan data of an area scan. The OCT images generated by the OCT controller 104 may comprise the structures, tissues, and/or portions of the eye that were scanned by the OCT scanner 102. For example, if the OCT scanner 102 scanned the anterior segment of the eye, then the generated scan data from the OCT scanner 102 may include data related to the cornea, the iris, the anterior lens, and/or the posterior lens, and the like, and the OCT image generated by the OCT controller 104 may include one or more structures of the anterior segment (e.g., the cornea, the iris, the anterior lens, and/or the posterior lens). The OCT controller 104 may be configured to perform image generation and/or image processing in real-time and/or near real-time.

In some implementations, the imagining system 100 may include an image generator (not shown separately) that is communicatively coupled to the OCT scanner 102 and the OCT controller 104. The image generator may be configured to receive scan data from the OCT scanner 102, and the image generator may be configured to generate an OCT image based on the scan data from the OCT scanner 102. The image generator may transmit the generated OCT image to the OCT controller 104. In some implementations, the image generator may be included in a computing device remote to imaging system 100 and communicatively coupled to one or more components (e.g., OCT scanner 102, OCT controller 104, and the like) of the imaging system 100. For example, the image generator may be included in and/or hosted on a server computing device that is communicatively coupled to the imaging system 100 via one or more communication interfaces, and the image generator may be configured to receive the scan data of the OCT scanner 102 via the one or more communication interfaces communicatively coupling the server computing device and the imaging system 100, and the transmit the generated OCT image to the OCT controller 104 via the one or more communication interfaces communicatively coupling the server computing device and the imaging system 100.

The OCT controller 104 may be configured with one or more detection algorithms configured to detect one or more structures of an eye in an OCT image. For example, the OCT controller 104 may be configured to with one or more detection algorithms to detect one or more structures of the anterior segment (e.g., cornea, iris, anterior lens, posterior lens, and the like) of the eye 110 in an OCT image. The OCT controller 104 may be configured with one or more cropping algorithms to crop an OCT image into one or more sub-images.

In some implementations, each cropping algorithm may be associated with or configured for cropping a certain structure of the eye. For example, the OCT controller 104 may be configured with a cropping algorithm associated with the cornea of an eye, another cropping algorithm associated with the iris of an eye, and yet another cropping algorithm associated with lens of the an eye. In some implementations, the OCT controller 104 may be configured with one or more cropping algorithms that are associated with a portion of a structure of an eye. For example, the OCT controller 104 may be configured with a cropping algorithm associated with an anterior lens, and another cropping algorithm associated with a posterior lens.

The OCT controller 104 may be configured to generate background and/or foreground seeds (e.g., templates) for each structure in a sub-image. The OCT controller 104 may be configured with one or more image segmentation algorithms, such as GrabCut algorithm, and the OCT controller 104 may be configured to generate masks for the structures in the sub-images using the one or more image segmentation algorithms (e.g., GrabCut) and the corresponding background and foreground seeds. The OCT controller 104 may be configured to extract contours of each structure in the one or more sub-images. Additional details of cropping OCT images into sub-images, generating background and foreground seeds for the structures in the sub-images, generating masks for the structures in the sub-images, and extracting contours are described herein with respect to FIGS. 3A, 3B, 4A-4G, and 5.

The OCT controller 104 may be configured to generate enhanced OCT images and/or sub-images by generating and/or displaying one or more virtual markers on one or more OCT images (e.g., the generated OCT image, a received OCT image, and the like) and/or sub-images to visually identify one or more contours of a detected and/or auto-segmented structure of the eye. For example, the OCT controller 104 may be configured to generate virtual markers on a sub-image comprising a lens of the eye, where the virtual markers visually identify an anterior lens contour and a posterior lens contour of the detected and/or auto-segmented lens of the eye in a sub-image and/or an OCT image.

The OCT controller 104 may be configured to generate and/or display the virtual markers in various shapes and/or sizes. For example, the OCT controller 104 may be configured to generate and/or display virtual markers that are curved, such as curvilinear lines. The OCT controller 104 may be configured to generate enhanced OCT images or enhanced sub-images by generating and/or displaying virtual markers on OCT images or sub-images.

The OCT controller 104 may be configured to cause OCT images/sub-images and/or the enhanced OCT images/sub-images to be displayed to a user by providing the images to the display 106 to be displayed to the user. The OCT controller 104 may be communicatively coupled and/or electrically connected to the display 106. The display 106 may be configured in compliance with one or more display standards and may be of any various types of displays, such as video graphics array (VGA), extended graphics array (XGA), digital visual interface (DVI), high-definition multimedia interface (HDMI), and the like.

Figure 2:
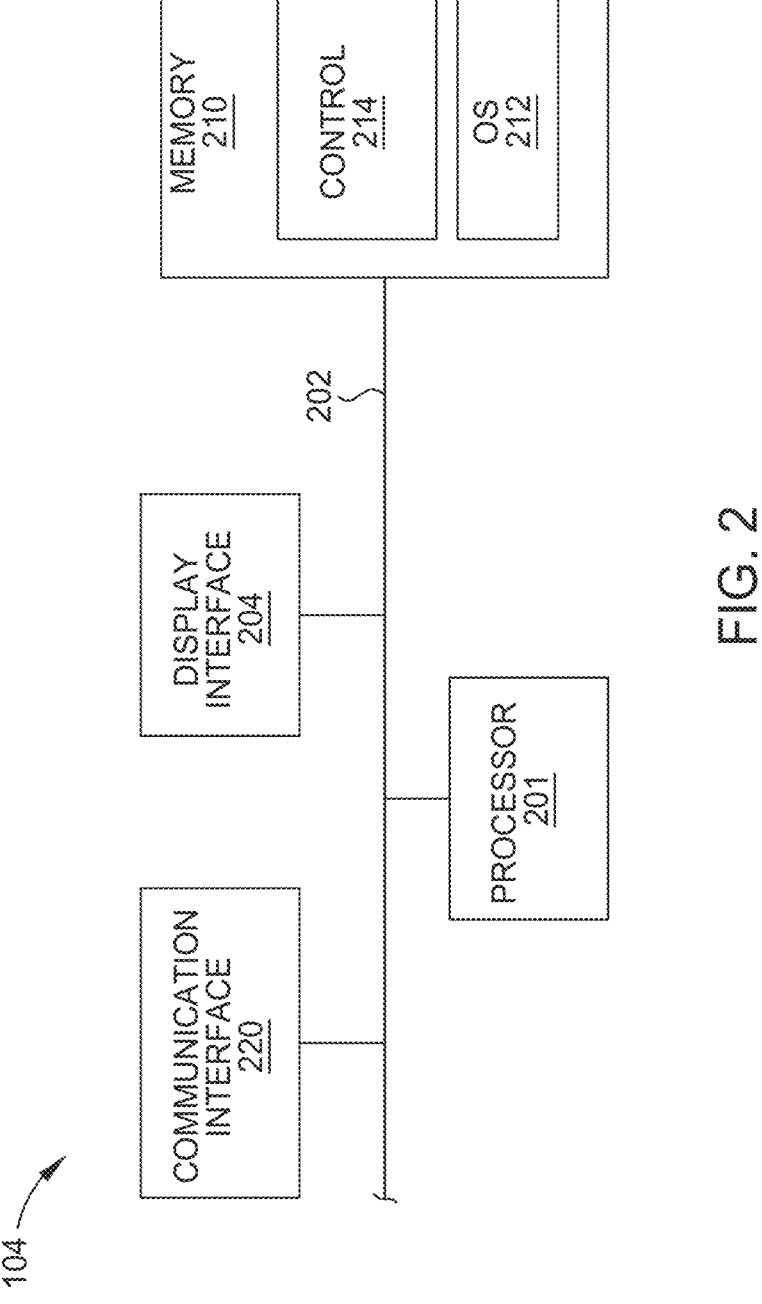
FIG. 2 illustrates a block diagram of selected components of an OCT controller, in accordance with certain embodiments of the present disclosure.

FIG. 2 illustrates a block diagram of selected components of an implementation of an OCT controller, such as the OCT controller 104 as described above in reference with FIG. 1. As shown in FIG. 2, OCT controller 104 includes processor 201, bus 202, display interface 204, memory 210, and communication interface 220.

The processor 201 is communicatively coupled to memory 210, display interface 204, and communication interface 220 via bus 202. The OCT controller 104 may be configured to interface with various external components (e.g., OCT scanner 102, display 106) of an imaging system (e.g., imaging system 100) via processor 201 and communication interface 220. In some implementations, communication interface 220 may be configured to enable OCT controller 104 to connect to a network (not shown). In some implementations, the OCT controller 104 may be connected to one or more displays, such as display 106, via display interface 204.

The memory 210 may include persistent, volatile, fixed, removable, magnetic, and/or semiconductor media. The memory 210 may be configured to store one or more machine-readable commands, instructions, data, and/or the like. In some implementations, as shown in FIG. 2, the memory 210 may include one or more sets and/or sequences of instructions, such as an operating system 212, a scanning control application 214, and the like. Examples of operating system 212 may include, but are not limited to, UNIX or UNIX-like operating system, a Windows® family operating system, or another suitable operating system. The scanning control application 214 may be configured to perform OCT controller operations as described herein including, but not limited to, operations related to initiation of scanning of the eye, generation of OCT images, OCT image processing, generation and/or displaying of virtual markers on OCT images, generation of enhanced OCT images, and the like.

Figure 3B:
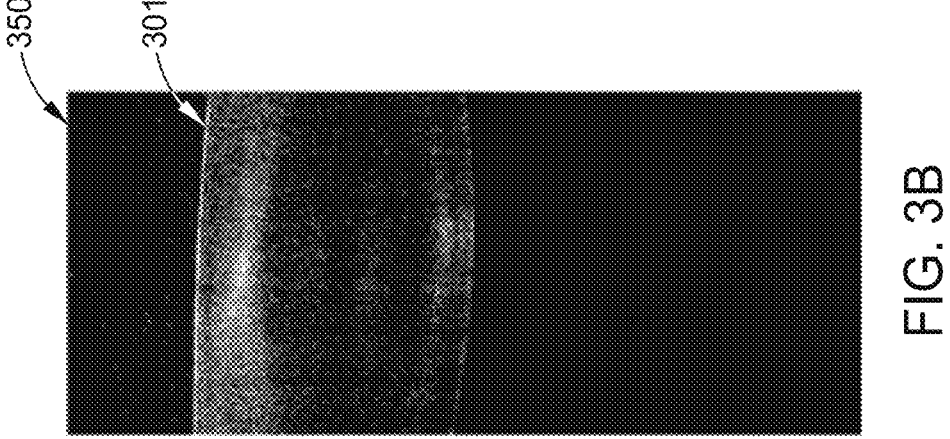
FIG. 3B illustrates an example sub-image of an OCT image, in accordance with certain embodiments of present disclosure.
Figure 3A:
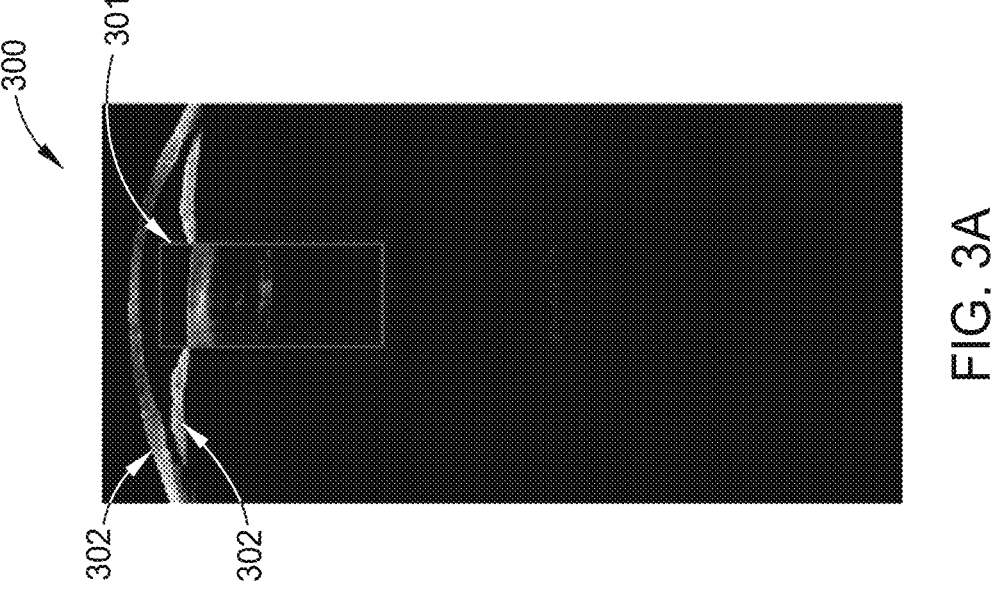
FIG. 3A illustrates an example OCT image of the anterior segment of an eye, in accordance with certain embodiments of the present disclosure.

FIG. 3A illustrates an example OCT image 300 comprising the anterior segment of an eye, in accordance with certain embodiments of the present disclosure. The OCT image 300 shown in FIG. 3A includes structures of the anterior segment of an eye, such as the lens 301, the iris 302, and the cornea 303. The OCT image 300 shown in FIG. 3A may be generated based on scan data of the anterior segment from the OCT scanner 102. As described above, in some implementations, the OCT controller 104 may be configured to generate an OCT image, such as the OCT image shown in FIG. 3A, based on scan data received from the scanner 102. In some implementations, another component (e.g., an image generator) of the imaging system 100 or an image generator included in a remote computing device (e.g., a server computing device) that is communicatively coupled to the imaging system 100 may be configured to generate an OCT image, such as the OCT image shown in FIG. 3A, based on scan data from the OCT scanner 102.

The OCT controller 104 may be configured to detect one or more structures of the anterior segment included in the OCT image 300 shown in FIG. 3A based on one or more structure detection algorithms. For example, based on one or more structure detection algorithms, the OCT controller 104 may be configured to detect the lens 301 in the OCT image 300. Similarly, based on one or more structure detection algorithms, the OCT controller 104 may be configured to detect the iris 302, and the cornea 303.

For each of the detected structures in the OCT image 300, the OCT controller 104 may be configured to crop the OCT image 300 into a corresponding sub-image comprising the detected structure. For example, in response to detecting the lens 301 in the OCT image 300, the OCT controller 104 may be configured to crop the OCT image 300 into a sub-image comprising the lens 301 and only the lens 301. An example of such a sub-image is shown in FIG. 3B. In FIG. 3B, sub-image 350 only includes lens 301.

The OCT controller 104 may be configured with a mapping between a structure of the anterior segment of the eye and one or more cropping algorithms. In some implementations, a data structure (e.g., a data table) may indicate for each structure of the anterior segment of the eye, one or more cropping algorithms configured to crop that structure from an OCT image. For example, for cropping the lens, a data table may indicate to the OCT controller 104 to use one or more cropping algorithms that are configured to crop the lens from an OCT image. Similarly, the data table may indicate, for an iris of the eye, one or more cropping algorithms configured to crop the iris of the eye from an OCT image, and the data table may indicate, for a cornea of the eye, one or more cropping algorithms configured to crop the cornea of the eye from an OCT image. In some implementations, the data structure indicating the mapping between a structure of an anterior segment of the eye and one or more cropping algorithms may be stored in a data storage unit communicatively coupled to the OCT controller 104 and the OCT controller 104 may be configured to access the data structure to retrieve the mapped cropping algorithms for each of the structures of an eye detected in an OCT image.

As described above, for each of the sub-images, the OCT controller 104 may be configured to generate masks for the structure included in the sub-image and may further be configured to extract contours for the structure in order to segment the structure in the OCT image. Additional details of generating the masks for the structures included in the sub-images, and extracting the contours of the structures to segment the structures are described herein with respect to FIGS. 4A-4G.

For the purpose of illustrating a clear example, FIGS. 4A-4G describe the process of segmenting a structure of the anterior segment, the lens, detected and/or identified in an OCT image. However, one skilled in the art should recognize that the process of segmenting the structure of the anterior segment, described in FIGS. 4A-4G, can also be applied to other structures of the anterior segment of the eye, such as the cornea, the iris, and the like.

Figures 4A, 4B, 4C, 4D:
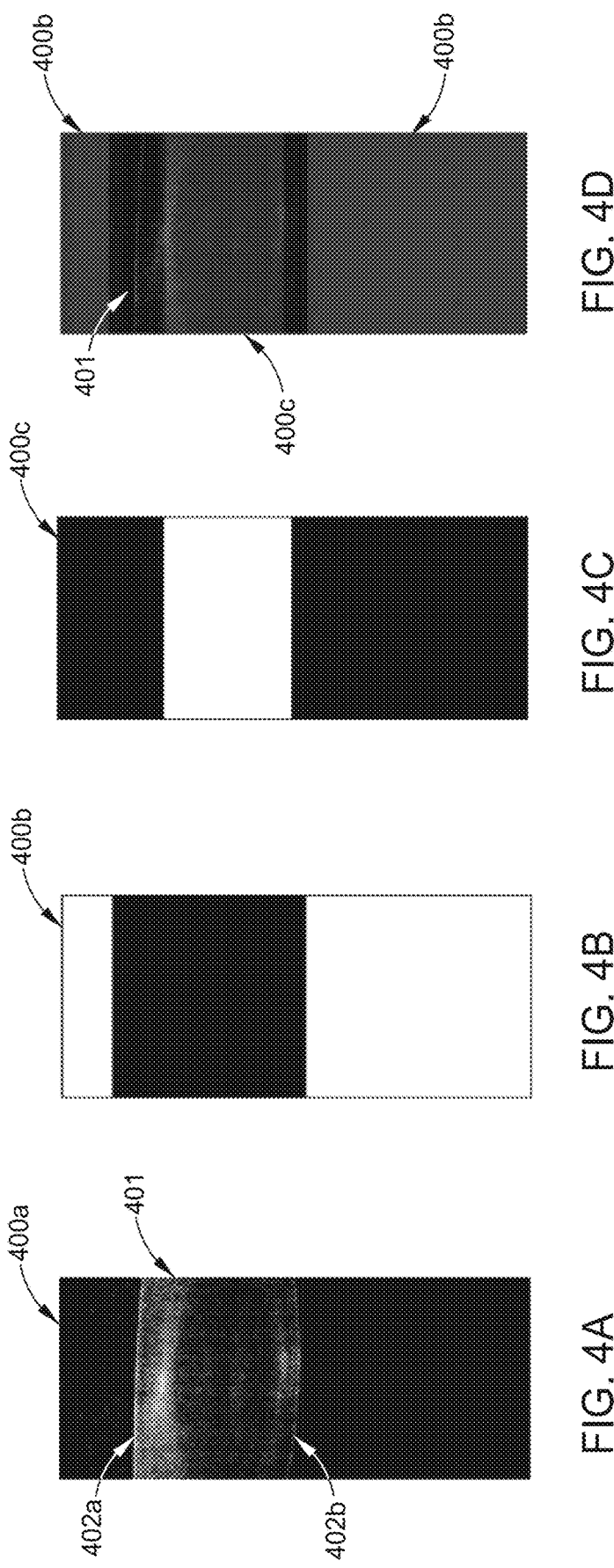
FIG. 4A illustrates an example sub-image of an OCT image of the of anterior segment, in accordance with certain embodiments of the present disclosure.
FIG. 4B illustrates an example background seed for a structure of the anterior segment of an eye, in accordance with certain embodiments of the present disclosure.
FIG. 4C illustrates an example foreground seed for a structure of the anterior segment of an eye, in accordance with certain embodiments of the present disclosure.
FIG. 4D illustrates an example OCT sub-image with overlaid background and foreground seeds for a structure of the anterior segment of an eye, in accordance with certain embodiments of the present disclosure.

FIG. 4A illustrates an example sub-image 400a of an OCT image (e.g., OCT image 300 as shown in FIG. 3A) including a structure in the anterior segment, i.e., the lens 401, detected in the OCT image. The OCT controller 104 may be configured to determine a depth of one or more portions of the structure included in the sub-image 400a. For example, the OCT controller 104 may be configured to apply one or more image processing techniques to determine depths of one or more portions of the lens 401, such as the depth of the anterior lens 402a, and a posterior lens 402b in the sub-image 400a.

Based on the determined depths of the one or more portions of the lens 401, the OCT controller 104 may be configured to generate a background seed for the lens 401 in the sub-image 400a. An example of a background seed for the lens 401 in the sub-image 400a is shown in FIG. 4B. In some implementations, as shown in FIG. 4B, the background seed 400b masks out portions of the sub-image 400a that includes image data related to the lens 401. The OCT controller 104 may be configured to generate the background seed 400b based on performing one or more image processing operations, such as one or more thresholding operations and/or one or more morphological image processing operations, on the image data of the sub-image 400a.

The OCT controller 104 may further be configured to generate a foreground seed for the lens 401 based on the determined depths of the one or more portions of the lens 401, such as the anterior lens 402a, and the posterior lens 402b in the sub-image 400a. An example of the foreground seed 400c for the lens 401 is shown in FIG. 4C. In some implementations, as shown in FIG. 4C, the foreground seed 400c masks out portions of the sub-image 400a that does not include image data related to the lens 401. Similar to the generation of the background seed 400b, the OCT controller 104 may be configured to generate the foreground seed 400c based on performing one or more image processing operations, such as one or more thresholding operations and/or one or more morphological image processing operations, on the image data of the sub-image 400b. The generated background seed 400b and foreground seed 400c of the lens 401 overlaid on sub-image 400a is shown in FIG. 4D.

The OCT controller 104 may be configured to generate a mask for the structure, i.e., the lens 401, in the sub-image 400a based on one or more image segmentation models and the background and foreground seeds 400b and 400c. Examples of the one or more image segmentation models include, but are not limited to, GrabCut, and the like. The OCT controller 104 may be configured to apply an image segmentation model on the background seed 400b and foreground seed 400c to generate a mask for the lens 401. The OCT controller 104 may be configured to apply the image segmentation model on the background seed 400b and the foreground seed 400c until convergence of the cost function of the image segmentation model. For example, the OCT controller 104 may be configured to apply the GrabCut image segmentation model until cost function of the GrabCut model is converged.

Figure 4G:
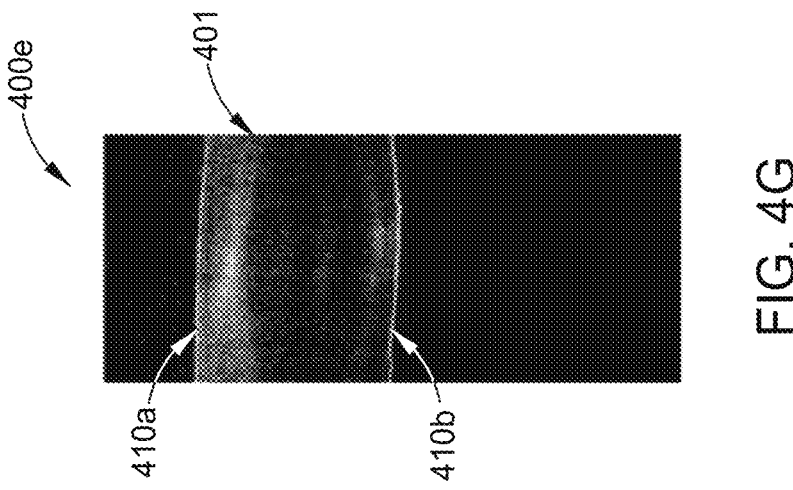
FIG. 4G illustrates an example enhanced OCT sub-image with virtual indicators identifying contours of a structure of the anterior segment of an eye, in accordance with certain embodiments of the present disclosure.
Figure 4F:
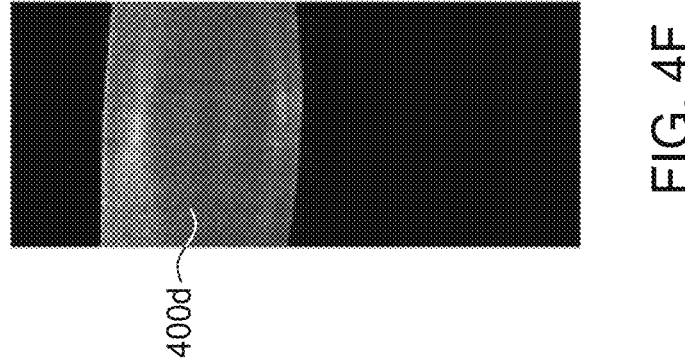
FIG. 4F illustrates an example OCT sub-image with overlaid mask for a structure of the anterior segment of an eye, in accordance with certain embodiments of the present disclosure.
Figure 4E:
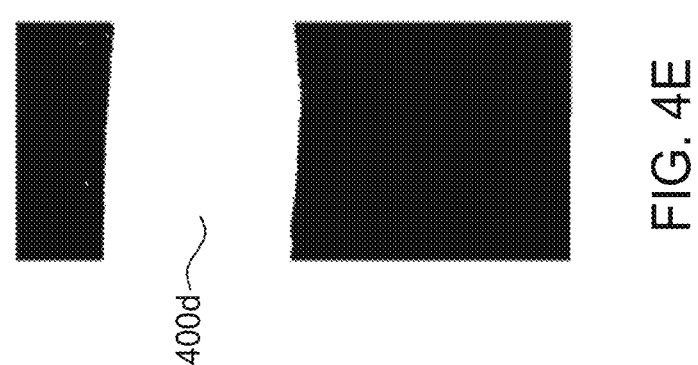
FIG. 4E illustrates an example mask for a structure of the anterior segment of an eye, in accordance with certain embodiments of the present disclosure.

At convergence of the cost function of the image segmentation model, the OCT controller 104 generates the final mask for the lens 401 in the sub-image 400a. An example of the mask 400d for the lens 401 in the sub-image 400a is shown in FIG. 4E. The OCT controller 104 may be configured to overlay the generated mask 400d for the lens 401 on the sub-image 400a. An example of the generated mask 400d overlaid on the sub-image 400a is shown in FIG. 4F.

The OCT controller 104 may be configured to extract one or more contours of the lens 401 based on the generated mask 400d. In some implementations the OCT controller 104 may be configured to detect one or more outer boundaries of the generated mask as the one or more contours of the structure of the eye in a sub-image 400a. For example, the OCT controller 104 may be configured to detect the top and bottom boundaries of the generated mask as the contours of the lens 401 in the sub-image 400a. In some implementations, the OCT controller 104 may be configured to determine the position data of the extracted contours of the lens 401 in the sub-image 400a.

In some implementations, the OCT controller 104 may be configured to generate enhanced sub-images by generating and/or displaying virtual markers on the sub-image, such as the sub-image 400a corresponding to the extracted contours of the structure included in the sub-image, such as lens 401 included in the sub-image 400a. The one or more displayed virtual markers may visually identify the one or more extracted contours of a structure of an anterior segment in a sub-image including the structure. An example of the enhanced sub-image 400e displaying virtual markers 410a, 410b identifying the contours of the lens 401 is shown in FIG. 4G.

Figure 5:
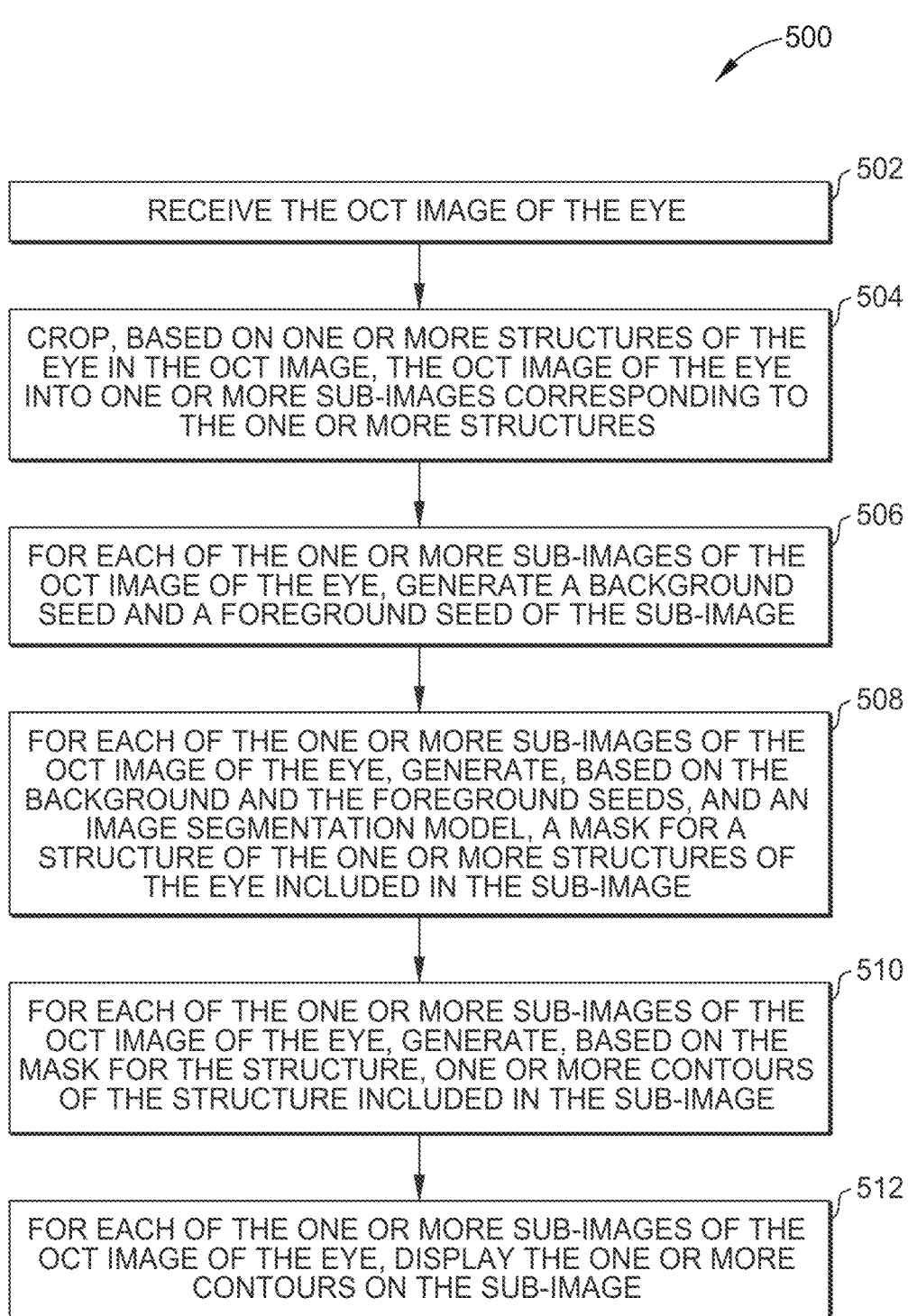
FIG. 5 illustrates a flow chart of an example method for automatically segmenting the anterior segment of a scanned eye in an OCT image, in accordance with certain embodiments of the present disclosure.

FIG. 5 illustrates a flow chart of an example method for image segmentation of optical coherence tomography (OCT) image of an eye, in accordance with certain embodiments of the present disclosure. The operations 500 may be performed, for example, by an OCT controller (e.g., the OCT controller 104 of imaging system 100). The operations 500 may be implemented as software components that are executed on one or more processors (e.g., processor 201). Note that although operations 500 are described herein as being performed by the OCT controller 104 of the imaging system 100, in certain implementation, operations 500 may be performed by a computing system or a server that is separate from and in communication with the imaging system 100.

The operations 500 may begin at 502, where the OCT controller 104 receives the OCT image of the eye. As described above, in some implementations, the OCT controller 104 may generate the OCT image of an eye based on the scan data of the OCT scanner 102, and in some implementations, the OCT controller 104 may receive an the OCT image from an image generation component of an imaging system (e.g., imaging system 100). At 504, the OCT controller 104 crops, based on one or more structures of the eye in the OCT image, the OCT image of the eye into one or more sub-images corresponding to the one or more structures.

At 506, for each of the one or more sub-images of the OCT image, the OCT controller 104 generates a background seed and a foreground seed of the sub-image. At 508, for each of the one or more sub-images, the OCT controller 104 generates, based on the background and the foreground seeds, and an image segmentation model, a mask for a structure of the one or more structures of the eye included in the sub-image. At 510, for each of the one or more sub-images, the OCT controller 104 generates, based on the mask for the structure, one or more contours of the structure included in the sub-image. At 512, for each of the one or more sub-images, the OCT controller 104, displays the one or more contours on the sub-image. For example, the OCT controller 104 may display one or more virtual markers corresponding to the one or more contours on the sub-image, where the one or more virtual markers visually identify the one or more contours and are overlaid on the positions of the one or more contours on the sub-image.

In some implementations, the OCT controller 104 crops the OCT image of the eye into one or more sub-images by identifying the one or more structures of the eye in the OCT image, selecting, based on the one or more structures of the eye, a set of cropping algorithms, and applying the set of cropping algorithms to crop the OCT image of the eye into the one or more sub-images. In some implementations, each cropping algorithm of the set of cropping algorithms is associated with at least one structure of the eye.

In some implementations, the one or more structures of the eye are identified based on a set of predetermined depths within the OCT image, and each predetermined depth of the set of predetermined depths is associated with at least a portion of the one or more structures of the eye. In some implementations, the OCT controller 104 generates the background seed and the foreground seed of the sub-image by generating one or more binary images of the sub-image, and by generating, based on the one or more binary images, the background and the foreground seeds of the sub-image.

In some implementations, the OCT controller 104 generates the one or more binary images of the sub-image by applying at least one of predetermined thresholding or predetermined morphological operations to the sub-image. In some implementations, the one or more structures of the eye includes at least one of a cornea, iris, or lens.

While the foregoing is directed to embodiments of the present disclosure, other and further embodiments of the disclosure may be devised without departing from the basic scope thereof, and the scope thereof is determined by the claims that follow.

What is claimed is:

1. A method for image segmentation of an optical coherence tomography (OCT) image of an eye, the method comprising:

receiving the OCT image of the eye;

cropping, based on one or more structures of the eye in the OCT image, the OCT image of the eye into one or more sub-images corresponding to the one or more structures, wherein cropping the OCT image of the eye into one or more sub-images, further comprises:

identifying an iris of the eye in the OCT image;

selecting, based on the iris of the eye, a set of cropping algorithms; and applying the set of cropping algorithms to crop the OCT image of the eye into the one or more sub-images;

for each of the one or more sub-images of the OCT image of the eye:

generating a background seed of the sub-image;

generating a foreground seed of the sub-image;

generating, based on both the background and the foreground seeds, and an image segmentation model, a mask for a structure of the one or more structures of the eye included in the sub-image;

generating, based on the mask for the structure, one or more contours of the structure included in the sub-image; and displaying the one or more contours on the sub-image.

2. The method of claim 1, wherein the iris of the eye is identified based on a set of predetermined depths within the OCT image, and wherein each predetermined depth of the set of predetermined depths is associated with at least a portion of the one or more structures of the eye.

3. The method of claim 1, wherein generating the background seed and the foreground seed of the sub-image, further comprises:

generating one or more binary images of the sub-image; and generating, based on the one or more binary images, the background and the foreground seeds of the sub-image.

4. The method of claim 3, wherein generating the one or more binary images of the sub-image, further comprises:

applying at least one of predetermined thresholding or predetermined morphological operations to the sub-image.

5. The method of claim 1, wherein the background seed is configured to facilitate masking out portions of the sub-image that includes image data related to the structure.

6. The method of claim 1, wherein the foreground seed is configured to facilitate masking out portions of the sub-image that do not include image data related to the structure.

7. An imaging system comprising:

a memory comprising computer-executable instructions;

a processor configured to execute the computer-executable instructions and cause the imaging system to:

generate, based on scan data of an eye, an optical coherence tomography (OCT) image of the eye;

crop, based on one or more structures of the eye in the OCT image, the OCT image of the eye into one or more sub-images corresponding to the one or more structures, wherein the processor is configured to crop the OCT image of the eye into one or more sub-images by:

identifying an iris of the eye in the OCT image;

selecting, based on the iris of the eye, a set of cropping algorithms; and applying the set of cropping algorithms to crop the OCT image of the eye into the one or more sub-images;

for each of the one or more sub-images of the OCT image of the eye:

generate a background seed of the sub-image;

generate a foreground seed of the sub-image;

generate, based on both the background and the foreground seeds, and an image segmentation model, a mask for a structure of the one or more structures of the eye included in the sub-image;

generate, based on the mask for the structure, one or more contours of the structure included in the sub-image; and display the one or more contours on the sub-image.

8. The imaging system of claim 7, wherein each cropping algorithm of the set of cropping algorithms is associated with at least one structure of the eye.

9. The imaging system of claim 7, wherein the iris of the eye is identified based on a set of predetermined depths within the OCT image, and wherein each predetermined depth of the set of predetermined depths is associated with at least a portion of the one or more structures of the eye.

10. The imaging system of claim 7, wherein the processor is configured to generate the background seed and the foreground seed of the sub-image by:

generating one or more binary images of the sub-image; and generating, based on the one or more binary images, the background and the foreground seeds of the sub-image.

11. The imaging system of claim 10, wherein the processor is configured to generate the one or more binary images of the sub-image by applying at least one of predetermined thresholding or predetermined morphological operations to the sub-image.

12. The imaging system of claim 7, wherein the background seed is configured to facilitate masking out portions of the sub-image that includes image data related to the structure.

13. The imaging system of claim 7, wherein the foreground seed is configured to facilitate masking out portions of the sub-image that do not include image data related to the structure.

14. A system comprising:

a memory comprising computer-executable instructions;

a processor configured to execute the computer-executable instructions and cause the system to:

receive scan data of an eye from an OCT imaging system;

generate, based on the scan data, an OCT image of the eye;

crop, based on one or more structures of the eye in the OCT image, the OCT image of the eye into one or more sub-images corresponding to the one or more structures, wherein cropping the OCT image of the eye into one or more sub-images, further comprises:

identifying an iris of the eye in the OCT image;

selecting, based on the iris of the eye, a set of cropping algorithms; and applying the set of cropping algorithms to crop the OCT image of the eye into the one or more sub-images;

for each of the one or more sub-images of the OCT image of the eye:

generate a background seed of the sub-image;

generate a foreground seed of the sub-image;

generate, based on both the background and the foreground seeds, and an image segmentation model, a mask for a structure of the one or more structures of the eye included in the sub-image;

generate, based on the mask for the structure, one or more contours of the structure included in the sub-image;

generate an enhanced sub-image by displaying one or more virtual markers on the sub-image, wherein the virtual markers correspond to the one or more contours of the structure; and transmit the enhanced sub-image to the OCT imaging system.

15. The system of claim 14, wherein the background seed is configured to facilitate masking out portions of the sub-image that includes image data related to the structure.

16. The system of claim 14, wherein the foreground seed is configured to facilitate masking out portions of the sub-image that do not include image data related to the structure.

* * * * *